United States Patent
McDermid

(10) Patent No.: US 8,355,009 B2
(45) Date of Patent: Jan. 15, 2013

(54) METHOD AND APPARATUS FOR DETERMINING COORDINATES OF SIMULTANEOUS TOUCHES ON A TOUCH SENSOR PAD

(76) Inventor: William J McDermid, Niwot, CO (US)

( * ) Notice: Subject to any disclaimer, the term of this patent is extended or adjusted under 35 U.S.C. 154(b) by 1118 days.

(21) Appl. No.: 12/107,244

(22) Filed: Apr. 22, 2008

(65) Prior Publication Data
US 2008/0296073 A1    Dec. 4, 2008

Related U.S. Application Data

(60) Provisional application No. 60/913,972, filed on Apr. 25, 2007.

(51) Int. Cl.
G06F 3/045    (2006.01)
(52) U.S. Cl. .................. 345/174; 178/18.01; 178/18.05; 178/18.03; 345/173; 345/179
(58) Field of Classification Search .......... 345/173–179; 178/18.01–19.04; 463/37–38
See application file for complete search history.

(56) References Cited

U.S. PATENT DOCUMENTS

| | | | | |
|---|---|---|---|---|
| 4,575,580 A | * | 3/1986 | Jandrell | 178/18.05 |
| 5,149,919 A | * | 9/1992 | Greanias et al. | 178/18.02 |
| 5,283,558 A | * | 2/1994 | Chan | 345/168 |
| 5,412,161 A | * | 5/1995 | Crooks et al. | 178/18.02 |
| 5,451,724 A | * | 9/1995 | Nakazawa et al. | 178/18.05 |
| 5,563,381 A | * | 10/1996 | Crooks et al. | 178/18.03 |
| 2002/0093491 A1 | * | 7/2002 | Gillespie et al. | 345/173 |
| 2002/0149571 A1 | * | 10/2002 | Roberts | 345/174 |
| 2003/0085882 A1 | * | 5/2003 | Lu | 345/173 |
| 2003/0095112 A1 | * | 5/2003 | Kawano et al. | 345/173 |
| 2003/0098858 A1 | * | 5/2003 | Perski et al. | 345/173 |
| 2003/0193482 A1 | * | 10/2003 | Kim | 345/173 |
| 2003/0214488 A1 | * | 11/2003 | Katoh | 345/173 |
| 2004/0119701 A1 | * | 6/2004 | Mulligan et al. | 345/173 |
| 2006/0197752 A1 | * | 9/2006 | Hurst et al. | 345/173 |
| 2010/0090979 A1 | * | 4/2010 | Bae | 345/174 |
| 2010/0127992 A1 | * | 5/2010 | Schmid | 345/173 |
| 2012/0162131 A1 | * | 6/2012 | Perski et al. | 345/174 |

* cited by examiner

Primary Examiner — Lun-Yi Lao
Assistant Examiner — Kelly B Hegarty

(57) ABSTRACT

Apparatuses and methods are provided for determining coordinates of simultaneous touches on a touch sensor pad. A touch sensor pad includes a first plurality of resistive sensor strips on a first resistive sheet and a second plurality of resistive sensor strips on a second resistive sheet. A user touches the touch sensor pad at multiple locations simultaneously. A controller of the touch sensor pad determines coordinates of each of the multiple locations of touch independently of other touches. To determine coordinates for a touch, the controller identifies a first strip of the first plurality of resistive sensor strips of the first resistive sheet making contact with a second strip of the second plurality of resistive sensor strips of the second resistive sheet in response to the touch. The controller measures voltages of the strips to determine coordinates of the touch and measures resistance shifts in the strips due to touches to determine contact area of the touch which correlates to the types of objects causing the touch and the pressure of the touch.

12 Claims, 12 Drawing Sheets

300

310

320

METHOD AND APPARATUS FOR DETERMINING COORDINATES OF SIMULTANEOUS TOUCHES ON A TOUCH SENSOR PAD

CROSS REFERENCE TO RELATED APPLICATIONS

This non-provisional application claims priority to U.S. provisional application 60/913,972 filed on Apr. 25, 2007, which is incorporated herein by reference.

BACKGROUND OF THE INVENTION

1. Field of the Invention

This invention relates to touch sensor pads, and in particular, to determining coordinates of simultaneous touches on a touch sensor pad.

2. Statement of the Problem

It is common to use touch sensor pads to receive information from a user. For example, it is common for retail stores to have a touch sensor pad that captures a buyer's signature as the buyer moves a stylus over the touch sensor pad. Touch sensor pads are also used on personal digital assistants (PDAs), tablet PCs, notebook computers and other computing devices for inputting data into the devices. For example, a PDA or tablet PC may allow a user to write or draw on a touch screen of the device using a stylus, and the touch sensor pad captures information regarding the user input. Other devices may display a graphical user interface (GUI) on a touch sensor screen, and allow the user to manipulate a software application by touching one or more objects displayed on the touch sensor screen.

One common type of touch sensor pad is constructed from two sheets of conductive materials facing one another other and each having a resistive coating on one side. FIG. 1 illustrates a prior art touch sensor pad 100. A first resistive sheet 110 has terminals 112 and 114 disposed on top and bottom ends of first resistive sheet 110. Terminal 112 is connected to a controller 130 through wire 150, and terminal 114 is connected to controller 130 through wire 152.

A second resistive sheet 120 has terminals 122 and 124 disposed on left and right ends of second resistive sheet 120. Terminal 122 is connected to controller 130 through wire 140, and terminal 124 is connected to controller 130 through wire 142. The conductive surfaces of first resistive sheet 110 and second resistive sheet 120 are disposed facing each other and spaced apart by regularly spaced insulator dots or spacers (not shown), which keep the sheets separated at rest. When the surface of touch sensor pad 100 is touched, the location of the touch point is determined by controller 130.

To determine the location of a touch point, a voltage is applied between terminals 112 and 114 to set up a voltage gradient along linearly resistive first resistive sheet 110. The location where a user touches touch sensor pad 100 causes a connection between first resistive layer 110 and second resistive sheet 120. As a result of the connection, the voltage potential of second resistive sheet 120 rises to the voltage at the touch point on first resistive sheet 110, and can be read from terminals 122 and 124 by controller 130. The measured voltage determines a coordinate in a first dimension (e.g., a y coordinate). The process is then repeated by applying a voltage between terminals 122 and 124 to set up a voltage gradient across second resistive sheet 120, and first resistive sheet 110 is left un-energized. The voltage potential on first resistive layer 110 rises to the voltage at the touch point on the second resistive sheet 120, and can be read from terminals 112 and 114 by controller 130 to determine a coordinate in a second dimension (e.g., an x coordinate).

It is a problem to have a touch sensor pad 100 that can resolve the location of multiple simultaneous touches with a high degree of accuracy. FIG. 2 illustrates a close up view of first resistive sheet 110 of FIG. 1. Referring to FIG. 2, a voltage gradient 210 is applied between terminals 112 and 114. Assume a user simultaneously touches touch sensor pad 100 at touch point 220 and touch point 222. Because both touch points 220 and 222 will make a connection between first resistive sheet 110 and second resistive sheet 120 (not visible in FIG. 2), the voltage potential of second resistive sheet 120 will rise to an average of the voltage at touch points 220 and 222. As a result, controller 130 will determine a single touch point 230 which is an average of the positions of touch points 220 and 222. This results in an input error determined by touch sensor pad 100.

The above described input error can occur when a user intentionally touches two points simultaneously, or when a user inadvertently touches touch sensor pad 100 at two points simultaneously, such as with a stylus and their palm. Additionally, it is a problem to determine which touch points are coming from a relatively sharp object (e.g., a pen, pencil, stylus, etc.), a finger, or a resting hand. Determining the type of object contacting touch sensor pad 100 may be useful in determining an action to perform based on the type of object contacting touch sensor pad 100, such as a button press, handwriting recognition, typing, etc.

SUMMARY OF THE SOLUTION

The present invention overcomes the above problems with apparatuses and methods for determining coordinates of simultaneous touches on a touch sensor pad. The touch sensor pad includes a first plurality of resistive sensor strips on a first resistive sheet and a second plurality of resistive sensor strips on a second resistive sheet. A user touches the touch sensor pad at multiple locations simultaneously on the first resistive sheet. A controller of the touch sensor pad determines coordinates of each of the multiple locations of touch independently of other touches. To determine coordinates for a touch, the controller identifies a first strip of the first plurality of resistive sensor strips of the first resistive sheet that is physically contacting a second strip of the second plurality of resistive sensor strips of the second resistive sheet in response to the touch. The controller also identifies a second strip of the second plurality of resistive sensor strips of the second resistive sheet corresponding to the touch contacting the touch sensor pad.

The intersection of the first strip and the second strip may define a region of the touch sensor pad where the touch is located. A parallel search may be used to find intersecting strips experiencing a touch. The controller may raise the voltage of all the strips of the second resistive sheet and detect the strips that see a voltage increase on the first resistive sheet. The controller then clears the voltage on all strips, raises the voltage of one of the detected strips on the first resistive sheet, and detects the strips on the second resistive sheet that see a voltage increase. The controller repeats this process for all of the detected strips on the first resistive sheet and thereby detects all the intersecting strips experiencing a touch.

In response to the touch, the first strip makes physical contact with the second strip, and when the first strip is energized, it applies a first voltage to the second strip of the second resistive sheet. The controller measures the first voltage from the second strip and determines a coordinate of the touch in one dimension (e.g., a y-dimension). When the second strip is energized, it applies a second voltage to the first strip of the first resistive sheet. The controller measures the second voltage from the first strip and determines a coordinate of the touch in another dimension (e.g., an x-dimension).

Further, the controller may determine an area of contact or a pressure of contact of a touch based on a resistance change of the first or second strip in response to the touch. A strip has a base resistance per unit length of the strip. As the two strips come in contact in response to a touch, a measured resistance of a strip will change based on the area of contact between the strips. The difference between the measured resistance and the base resistance of the strip may be correlated to an area of contact of the touch, or a pressure of contact of the touch.

The invention may include other exemplary embodiments described below.

ASPECTS

An aspect of the invention is a method for determining coordinates of simultaneous touches on a touch sensor pad, the touch sensor pad including a first plurality of resistive sensor strips on a first resistive sheet and a second plurality of resistive sensor strips on a second resistive sheet, the method of determining comprising the steps of: determining coordinates of each of the multiple locations of touch independently of other touches, the determining step for a touch comprising: identifying a first strip of the first plurality of resistive sensor strips of the first resistive sheet that is physically contacting a second strip of the second plurality of resistive sensor strips of the second resistive sheet in response to the touch; identifying the second strip; measuring a first voltage of the second strip applied by the first strip while in contact with the second strip in response to the touch; measuring a second voltage of the first strip applied by the Preferably, the first strip has a base resistance and the determining step for a touch further comprises: measuring a measured resistance of the first strip during contact between the first strip and the second strip in response to the touch; and determining an area of contact of the touch based on a difference between the measured resistance and the base resistance.

Preferably, the method further comprises identifying a type of object contacting the touch sensor pad at the coordinates of the touch based on the area of contact; and determining an action corresponding to the coordinates based on the type of object contacting the touch sensor pad.

Preferably, the first strip has a first resistance per unit length that is less than a second resistance per unit length of the second strip.

Preferably, the first strip has a base resistance and the method further comprises: measuring a measured resistance of the first strip during contact between the first strip and the second strip in response to the touch; and determining a pressure of contact applied by an object to the touch sensor pad at the coordinates of the touch based on a difference between the measured resistance and the base resistance.

Preferably, the method further comprises: determining whether a first strip of a first touch and a first strip of a second touch are the same resistive sensor strip; determining a first resistance of a second strip of the first touch; determining a second resistance of a second strip of the second touch; and adjusting first coordinates of the first touch and second coordinates of the second touch based on the first resistance and the second resistance.

Preferably, measuring the first voltage further comprises: energizing the first strip to generate a voltage gradient along the first strip; and measuring a voltage of the second strip to determine the first voltage applied by the first strip in response to the touch.

Preferably, measuring the first voltage further comprises: energizing terminals of the first strip to a terminal voltage to generate a voltage gradient along the first strip; measuring a third voltage of the second strip applied by the first strip in response to the touch; and subtracting an offset voltage from the third voltage to determine the first voltage.

Preferably each of the first plurality of resistive sensor strips are assigned a sequential index value, and the offset voltage is determined based on the terminal voltage times an index value of the second strip divided by a number of the first plurality of resistive sensor strips.

Preferably, identifying the first strip further comprises: conducting a parallel search of the first plurality of resistive sensor strips to identify the first strip.

Preferably, conducting the parallel search further comprises: raising the voltage of all the resistive sensor strips of the second sheet; detecting the resistive sensor strips of the first sheet that experience a voltage increase; clearing the voltage on all the strips; raising the voltage of one of the detected resistive sensor strips of the first sheet; detecting the resistive sensor strips of the second sheet that experience a voltage increase; repeat processing of detected resistive sensor strips on the first sheet until all intersecting strips experiencing a touch have been detected.

Preferably, the method further comprises: tracking a minimum voltage and a maximum voltage measured on the first strip, wherein the minimum voltage represents a first physical location of a first boundary of the first strip, and the second boundary represents a second physical location of a second boundary of the first strip; and calculating the coordinates of the touch by interpolating between the first and second physical locations of the first and second boundaries based on where the second voltage falls between the minimum and maximum voltages.

Preferably each of the first plurality of resistive sensor strips include a terminal, and the method further comprises: drawing a line across the first resistive sheet proximate at least one terminal; measuring a sequence of calibration voltages of each of the first plurality of resistive sensor strips in response to drawing the line; and determining a position of each terminal based on the sequence of calibration voltages of each of the first plurality of resistive sensor strips.

Preferably, the method further comprises: determining a position error of the first strip based on a position of a terminal of the first strip; and adjusting the coordinates of the touch based on the position error.

Another aspect of the invention is a method for determining coordinates of simultaneous touches on a touch sensor pad, the method of determining comprising the steps of: providing a touch sensor pad including a first plurality of resistive sensor strips on a first resistive sheet and a second plurality of resistive sensor strips on a second resistive sheet; determining coordinates of each of the multiple locations of touch independently of other touches, the determining step for a touch comprising: identifying a first strip of the first plurality of resistive sensor strips of the first resistive sheet that is physically contacting a second strip of the second plurality of resistive sensor strips of the second resistive sheet in response to the touch; identifying the second strip; measuring a first voltage of the second resistive sheet; measuring a second voltage of the first resistive sheet; and determining coordinates of the touch based on the first voltage and the second voltage.

Another aspect of the invention is an apparatus for determining coordinates of simultaneous touches on a touch sensor pad, the apparatus comprising: an interface coupled to a first plurality of resistive sensor strips on a first resistive sheet of the touch sensor pad and coupled to a second plurality of resistive sensor strips on a second resistive sheet of the touch sensor pad; and a processing system coupled to the interface and adapted to determine coordinates of each of the multiple locations of touch independently of other touches, the processing system adapted to determine coordinates for a touch by: identifying a first strip of the first plurality of resistive sensor strips of the first resistive sheet that is physically contacting a second strip of the second plurality of resistive sensor strips of the second resistive sheet in response to the touch; identifying the second strip of the second plurality of resistive sensor strips of the second resistive sheet; measuring a first voltage of the second strip applied by the first strip while in contact with the second strip in response to the touch; measuring a second voltage of the first strip applied by the second strip while in contact with the first strip in response to the touch; and determining coordinates of the touch based on the first voltage and the second voltage.

Preferably, the first strip has a base resistance and the processing system is further adapted to: measure a measured resistance of the first strip during contact between the first strip and the second strip in response to the touch; and determine an area of contact of the touch based on a difference between the measured resistance and the base resistance.

Preferably, the first strip has a first resistance per unit length that is less than a second resistance per unit length of the second strip.

Preferably, the processing system is further adapted to: identify a type of object contacting the touch sensor pad at the coordinates of the touch based on the area of contact; and determine an action corresponding to the coordinates based on the type of object contacting the touch sensor pad.

Preferably, the processing system is further adapted to: measure a measured resistance of the first strip during contact between the first strip and the second strip in response to the touch; and determine a pressure of contact applied by an object to the touch sensor pad at the coordinates of the touch based on a difference between the measured resistance and the base resistance.

Preferably, the processing system is further adapted to: determine whether a first strip of a first touch and a first strip of a second touch are the same resistive sensor strip; determine a second resistance of a second strip of the first touch; determine whether a first strip of a first touch and a first strip of a second touch are the same resistive sensor strip; determine a first resistance of a second strip of the first touch; determine a second resistance of a second strip of the second touch; and adjust first coordinates of the first touch and second coordinates of the second touch based on the first resistance and the second resistance.

Preferably, the processing system is further adapted to: energize the first strip to generate a voltage gradient along the first strip; and measure a voltage of the second strip to determine the first voltage applied by the first strip.

Preferably, the processing system is further adapted to: energize terminals of the first strip to a terminal voltage to generate a voltage gradient along the first strip; measure a third voltage of the second strip applied by the first strip; and subtract an offset voltage from the third voltage to determine the first voltage.

Preferably each of the first plurality of resistive sensor strips are assigned a sequential index value, and the offset voltage is determined based on the terminal voltage times an index value of the second strip divided by a number of the first plurality of resistive sensor strips.

Preferably, the processing system is further adapted to: conduct a parallel search of the resistive sensor strips to identify the first strip and second strip.

Preferably, the processing system is further adapted to: raise the voltage of all the resistive sensor strips of the second sheet; detect the resistive sensor strips of the first sheet that experience a voltage increase; clear the voltage on all strips; raise the voltage of one of the detected resistive sensor strips of the first sheet; detect the resistive sensor strips of the second sheet that experience a voltage increase; and repeat processing the detected resistive sensor strips on the first sheet until all intersecting strips experiencing a touch are detected.

Preferably, the processing system is further adapted to: track a minimum voltage and a maximum voltage measured on the first strip, wherein the minimum voltage represents a first physical location of a first boundary of the first strip, and the second boundary represents a second physical location of a second boundary of the first strip; and calculate the coordinates of the touch by interpolating between the first and second physical locations of the first and second boundaries based on where the second voltage falls between the minimum and maximum voltages.

Preferably each of the first plurality of resistive sensor strips include a terminal, and the processing system is further adapted to: measure a sequence of calibration voltage of the first plurality of resistive sensor strips in response to an operator drawing a line proximate at least one terminal; and determine a position of each terminal based on the sequence of calibration voltages of the first plurality of resistive sensor strips.

Preferably, the processing system is further adapted to: determine a position error of the first strip based on a position of a terminal of the first strip; and adjust the coordinates of the touch based on the position error.

DESCRIPTION OF THE DRAWINGS

The above and other advantages and features of the invention may be better understood from a reading of the detailed description taken in conjunction with the drawings in which the same reference number represents the same element or similar type of element on all drawings.

DETAILED DESCRIPTION OF THE INVENTION

FIGS. 3-21 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 3:
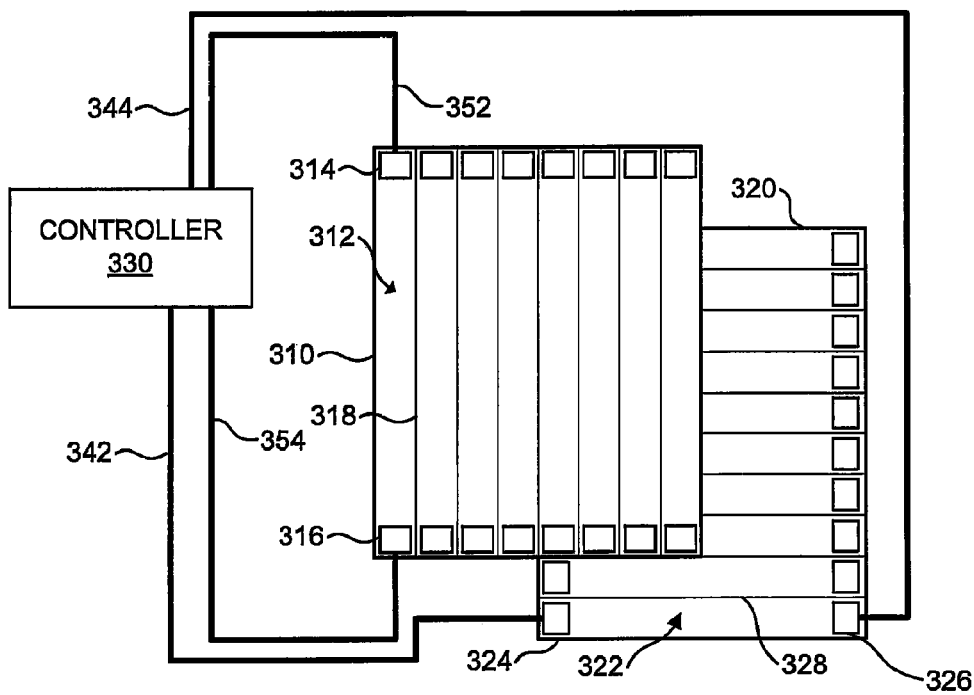
FIG. 3 illustrates a touch sensor pad in an exemplary embodiment of the invention.

FIG. 3 illustrates a touch sensor pad 300 in an exemplary embodiment of the invention. Touch sensor pad 300 includes a first resistive sheet 310 and a second resistive sheet 320. First resistive sheet 310 may comprise a clear, flexible insulator sheet with a linear resistive coating on one side (e.g., Indium Tin Oxide). The resistive coating may comprise a plurality of strips (e.g., strip 312) running a length of first resistive sheet 310. Each strip is separated from other strips of the resistive coating by an insulator strip (e.g., insulator 318 which separates strip 312 from an adjacent strip). Each strip further comprises terminals on each end of the strip (e.g., terminal 314 and terminal 316 of strip 312).

Second resistive sheet 320 is constructed in a similar manner. The resistive coating side of first resistive sheet 310 is disposed facing the resistive coating side of second resistive sheet 320. There may be a plurality of strips (e.g., strip 322) running a length of second resistive sheet 320. The strips of second resistive sheet 320 are separated from other strips of the resistive coating by an insulator strip (e.g., insulator 328 which separates strip 322 from an adjacent strip). Each strip further comprises terminals on each end of the strip (e.g., terminal 324 and terminal 326 of strip 322).

The strips of second resistive sheet 320 are disposed in a direction perpendicular to strips of first resistive sheet 310 when both sheets are facing one another. The strips of first resistive sheet 310 and second resistive sheet 320 form a matrix or grid of touch sensor regions of touch sensor pad 300, with the intersection of a strip of first resistive sheet 310 and a strip of second resistive sheet 320 forming a single region of the grid. First resistive sheet 310 and second resistive sheet 320 may be separated by regularly spaced insulator dots which keep the sheets apart at rest. When a user touches touch sensor pad 300, one or more strips of first resistive sheet 310 will come in contact with one or more strips of second resistive sheet 320, allowing a controller 330 to measure attributes (e.g., a voltage or resistance) of the strips to determine information regarding the touch point.

Figure 4:
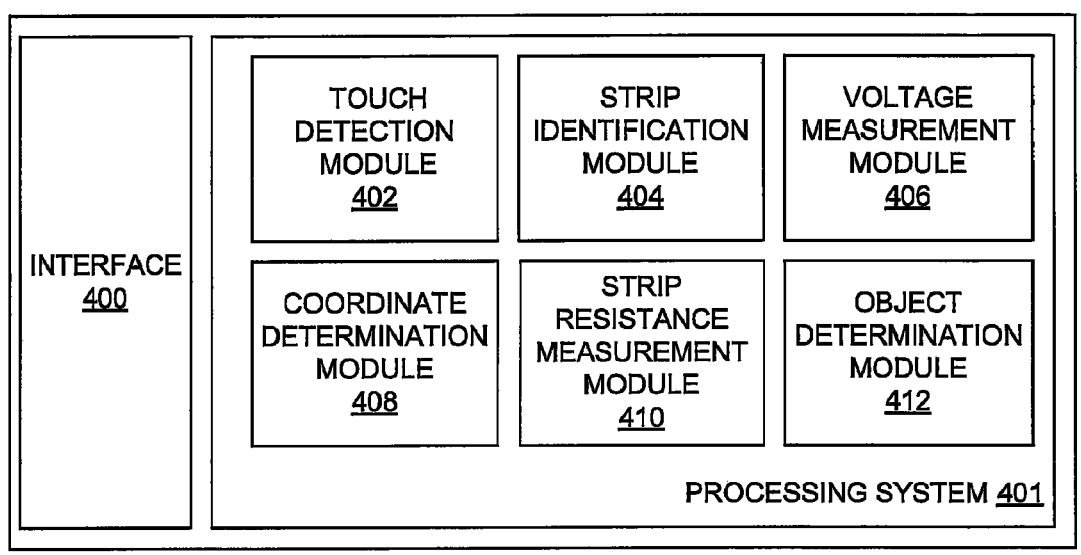
FIG. 4 illustrates a close up view of a controller of the touch sensor pad of FIG. 3 in an exemplary embodiment of the invention.

Controller 330 is connected to terminals 314 and 316 of strip 312 of first resistive sheet 310 using wires 352 and 354. Controller 330 may connect to pairs of terminals for other strips of first resistive sheet 310 using additional pairs of wires. Terminals 324 and 326 of strip 322 of second resistive sheet 320 are connected to controller 330 through wires 342 and 344. Likewise, controller 330 may connect to other terminals of other strips of second resistive sheet 320 using additional pairs of wires. First resistive sheet 310 and second resistive sheet 320 may comprise any number of strips across their surfaces, and the strips may be of any size according to desired design criteria of touch sensor pad 300. Each pair of wires for a terminal may be connected to FIG. 4 illustrates a close up view of controller 330 of FIG. 3 in an exemplary embodiment of the invention. Controller 330 comprises an interface 400 coupled to strips of first resistive sheet 310 and coupled to strips of second resistive sheet 320. Using interface 400, controller 330 may energize strips of first resistive sheet 310 and strips of second resistive sheet 320, as well as measure attributes of the strips, including voltages, resistances, etc. Interface 400 may comprise switches (not shown), multiplexers (not shown), and other similar components used to energize and/or measure values of strips of first resistive sheet 310 and strips of second resistive sheet 320.

Controller 330 may also comprise processing system 401. Processing system 401 may comprise touch detection module 402, which is adapted to determine touches by objects on touch sensor pad 300. Processing system 401 may also comprise strip identification module 404, which is adapted to identify strips of first resistive sheet 310 and second resistive sheet 320 which may be in physical contact with each other in response to a touch point on touch sensor pad 300. Strip identification module 404 may utilize parallel searches and/or other search techniques to identify strips making contact in response to a touch point Processing system 401 may further comprise voltage measurement module 406, which is adapted to measure voltages of strips of first resistive sheet 310 and second resistive sheet 320. Coordinate determination module 408 of processing system 401 is adapted to determine coordinates of touches on touch sensor pad 300 based on voltages measured by voltage measurement module 406. Processing system 401 may further comprise strip resistance measurement module 410, which is adapted to measure resistances of strips of first resistive sheet 310 and/or second resistive sheet 320. Object determination module 412 of processing system 401 is adapted to utilize resistances measured by strip resistance measurement module 410 to determine a type or pressure of an object contacting touch sensor pad 300.

Those of ordinary skill in the art will readily recognize that the various functional elements 400 through 412 shown as operable within controller 330 and processing system 401 may be combined into fewer discrete elements or may be broken up into a larger number of discrete functional elements as a matter of design choice. Thus, the particular functional decomposition suggested by FIG. 4 is intended merely as exemplary of one possible functional decomposition of elements within controller 330 and processing system 401. Further, touch sensor pad 300 and controller 330 may comprise additional elements not illustrated in FIGS. 3-4 for the sake of brevity. Subsequent figures will be discussed in reference to touch pad sensor 300 in FIGS. 3-4.

Figure 5:
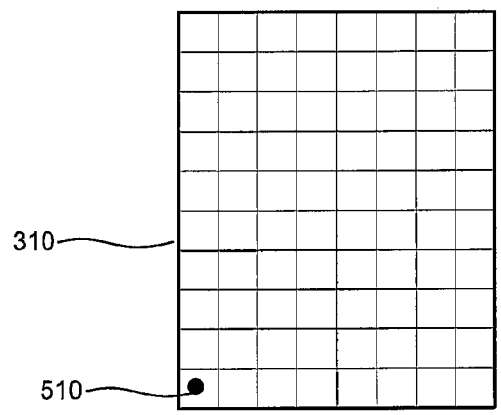
FIG. 5 illustrates a top view of the touch sensor pad of FIG. 3 in an exemplary embodiment of the invention.

FIG. 5 illustrates a top view of touch sensor pad 300 of FIG. 3 in an exemplary embodiment of the invention. More specifically, FIG. 5 illustrates a matrix formed by the intersection of strips of first resistive sheet 310 oriented in one direction, and strips of second resistive sheet 320 (not visible in FIG. 5) oriented in another direction. The strips of second resistive sheet 320 are oriented perpendicular to the strips of first resistive sheet 310.

Figure 1:
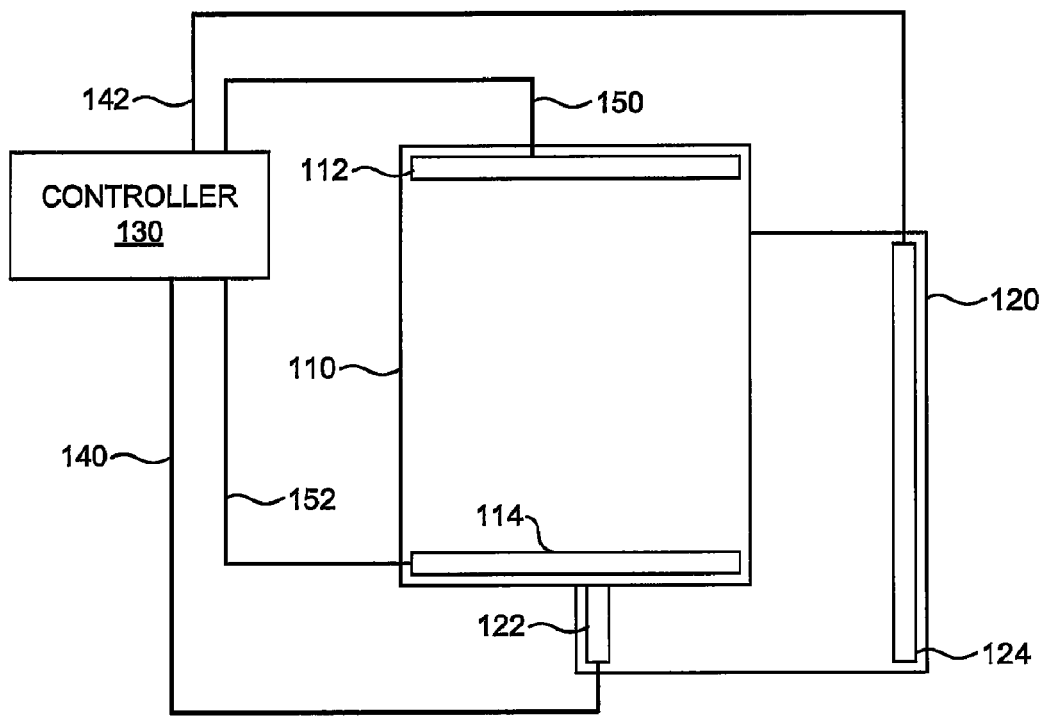
FIG. 1 illustrates a prior art touch sensor pad.
Figure 2:
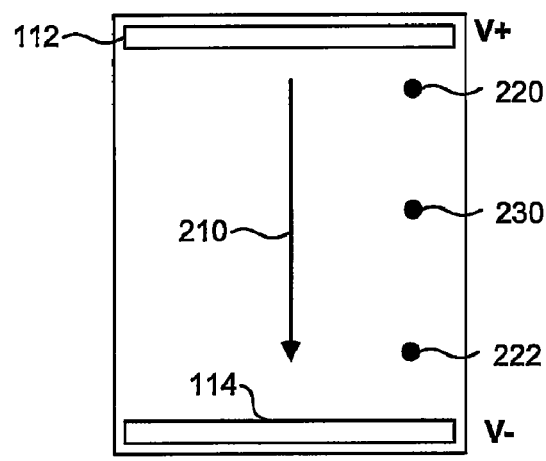
FIG. 2 illustrates a close up view of a first resistive sheet of the touch sensor pad of FIG. 1.

To determine a coordinate of a location of touch using prior art touch sensor pad 100 of FIG. 1, an entire surface of first resistive sheet 110 is energized, and a corresponding voltage from a point of contact between first resistive sheet 110 and second resistive sheet 120 is measured from second resistive sheet 120. However, because first resistive sheet 310 of touch sensor pad 300 (see FIG. 3) is separated into a plurality of strips, each strip may be energized independently of other strips on the same surface. Thus, if there is no touch along the surface of a strip (e.g., strip 312) of first resistive sheet 310, then no increase in the voltage potential of second resistive sheet 320 will occur. However, if there is a touch along the surface of a strip of first resistive sheet 310, then the energized strip will apply a voltage to one or more strips of second resistive sheet 320. Thus, an increase in the voltage potential of second resistive sheet 320 may be measured. Similar advantages are found using strips of second resistive sheet 320. This allows controller 330 to independently and accurately determine multiple touch points across the surface of touch sensor pad 300.

The following process may be used to determine whether there is a touch in one strip of first resistive sheet 310, and to further determine a coordinate of location of a touch point in a first dimension of touch sensor pad 300. Assume that a user touches touch sensor pad 300 at touch point 510 (see FIG. 5). Controller 330 energizes strip 312 of first resistive sheet 310 to check for touches, and the other strips of touch sensor pad 300 are left un-energized. Controller 330 applies a voltage gradient along strip 312 between terminals 314 and 316. Second resistive sheet 320 may be attached to a pull down resistor (not shown), and left un-energized.

Figure 6:
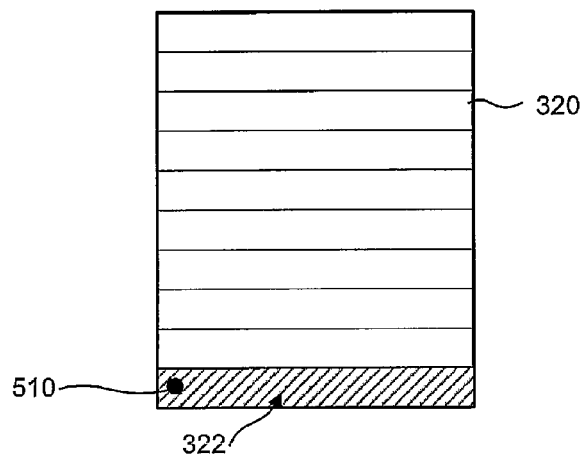
FIG. 6 illustrates a top view of a second resistive sheet of the touch sensor pad of FIG. 3 in an exemplary embodiment of the invention.

If a user touches touch sensor pad 300 along strip 312, then strip 312 will make physical contact with second resistive sheet 320. Touch point 510 has a corresponding voltage which is based on a position along the voltage gradient of strip 312. The voltage is applied to strip 322 of second resistive sheet 320, and the applied voltage overcomes the pull down resistor and raises the voltage potential of second resistive sheet 320. FIG. 6 illustrates a top view of second resistive sheet 320 of FIG. 3. in an exemplary embodiment of the invention. More specifically, FIG. 6 illustrates strip 322 of second resistive sheet 320 energized to a voltage applied by strip 312 (not visible in FIG. 6) of first resistive sheet 310 in response to touch point 510 (see FIG. 5).

Controller 330 may measure the voltage of second resistive sheet 320 using terminals 324 and 326. The measured voltage determines a coordinate in a first dimension (e.g., a y coordinate) of touch point 510. If there was no touch along strip 312, then controller 330 would determine that no voltage potential increase occurred in second resistive sheet 320, and thus, determine that there is no touch along strip 312.

Figure 7:
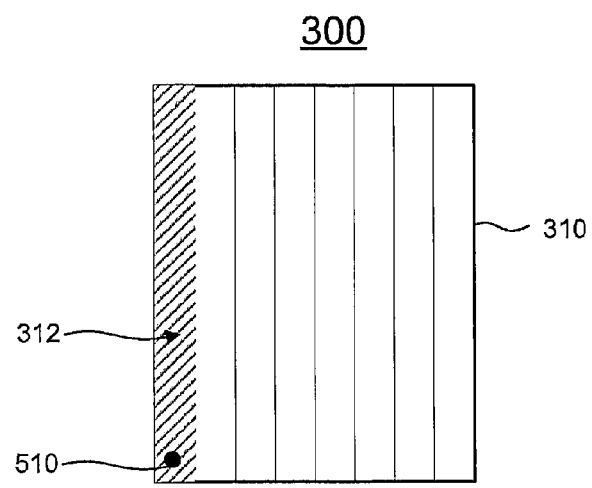
FIG. 7 illustrates a top view of a first resistive sheet of the touch sensor pad of FIG. 3 in an exemplary embodiment of the invention.

The process may then be repeated on second resistive sheet 320 to determine coordinates of touches in a second dimension. For example, controller 330 may energize strip 322 between terminals 324 and 326 to set up a voltage gradient across second strip 322. First resistive sheet 310 may also be attached to a pull down resistor (not shown), and left un-energized. Because of touch point 510, strip 322 will make physical contact with and apply a voltage to first resistive sheet 310, which may be measured by controller 330 across terminals 314 and 316. FIG. 7 illustrates a top view of first resistive sheet 310 of FIG. 3 in an exemplary embodiment of the invention. More specifically, FIG. 7. illustrates strip 312 of first resistive sheet 310 energized to a voltage applied by strip 322 (not visible in FIG. 7) of second resistive sheet 320 in response to touch point 510 (see FIG. 5).

The measured voltage determines a coordinate of touch point 510 in a second dimension (e.g., an x coordinate). This process may be repeated for additional strips along both first resistive sheet 310 and second resistive sheet 320 to determine multiple simultaneous touch points on touch sensor pad 300.

Figure 8:
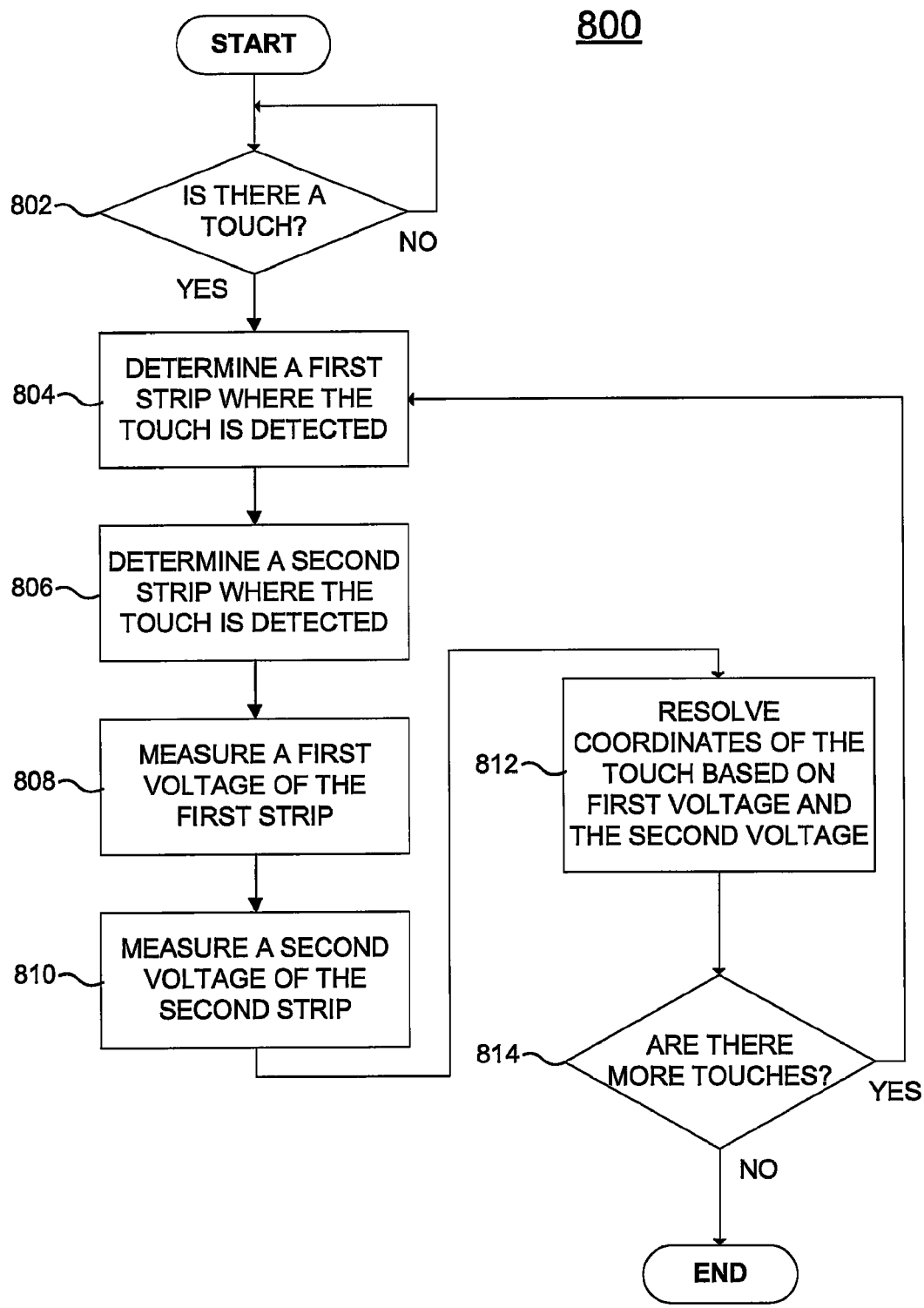
FIG. 8 illustrates a flow chart of a method for determining coordinates of simultaneous touches on a touch sensor pad in an exemplary embodiment of the invention.

FIG. 8 illustrates a flow chart of a method 800 for determining coordinates of simultaneous touches on touch sensor pad 300 in an exemplary embodiment of the invention. The steps of method 800 will be discussed with respect to touch sensor pad 300 illustrated in FIGS. 3-6 and FIGS. 9-11. The steps of method 800 are not all inclusive, and may include other steps not shown for the sake of brevity.

In step 802, controller 330 determines whether there is a touch on touch sensor pad 300. To determine whether there is a touch on touch sensor pad 300, controller 330 may drive terminals of one end of all of the strips of first resistive sheet 310 to a positive voltage (V+), and leave the terminals at the other end of the strips floating so that no current will flow. Controller 330 connects the strips of second resistive sheet 320 to touch detection module 402 and activates a pull down resistor attached to second resistive sheet 320. If there is a touch on touch sensor pad 300, then the pulled down signal from second resistive sheet 320 will rise, signaling a touch. If a touch is detected, then controller 330 moves to step 804. Otherwise, controller 330 continues looping through step 802 until a touch is detected.

Figure 9:
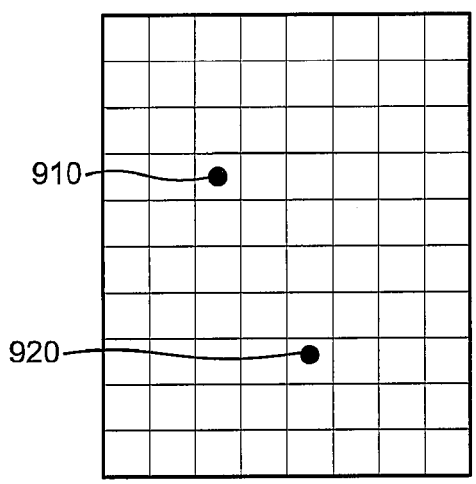
FIG. 9 illustrates a top view of the touch sensor pad of FIG. 3 in an exemplary embodiment of the invention.

Assume that a user touches touch sensor pad 300 at two locations simultaneously. FIG. 9 illustrates a top view of touch sensor pad 300 of FIG. 3 in an exemplary embodiment of the invention. More specifically, FIG. 9 illustrates a touch point 910 and a touch point 920 on touch sensor pad 300.

Figure 10:
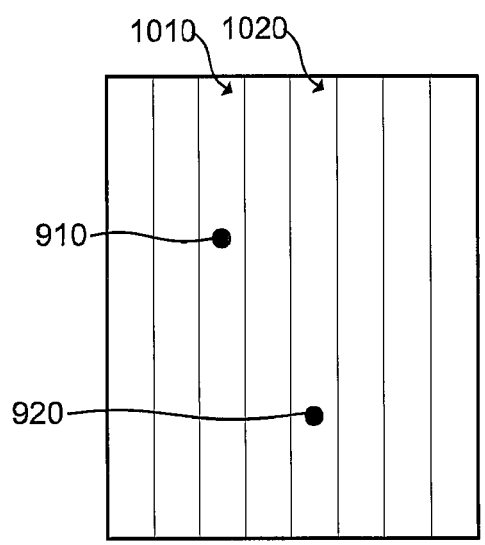
FIG. 10 illustrates a top view of a first resistive sheet of the touch sensor pad of FIG. 9 in an exemplary embodiment of the invention.
Figure 11:
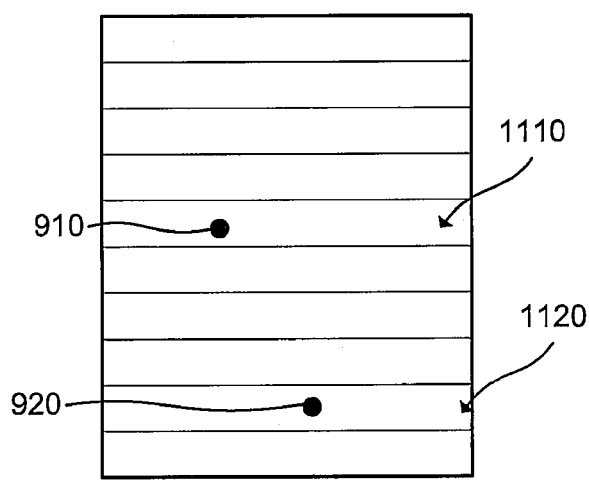
FIG. 11 illustrates a top view of a second resistive sheet of the touch sensor pad of FIG. 9 in an exemplary embodiment of the invention.

FIG. 10 illustrates a top view of a first resistive sheet 310 (not visible in FIG. 9) of touch sensor pad 300 of FIG. 9 in an exemplary embodiment of the invention. FIG. 11 illustrates a top view of a second resistive sheet 320 (not visible in FIG. 9) of touch sensor pad 300 of FIG. 9 in an exemplary embodiment of the invention. Touch point 910 of FIG. 9 will touch a first strip 1010 (see FIG. 10) on first resistive sheet 310, and a second strip 1110 (see FIG. 11) on second resistive sheet 320. Touch point 920 of FIG. 9 will touch a third strip 1020 (see FIG. 10) on first resistive sheet 310, and a fourth strip 1120 (see FIG. 11) on second resistive sheet 320.

In step 804, strip identification module 404 of controller 330 identifies first strip 1010 of first resistive sheet 310 that is physically contacting second strip 1110 of second resistive sheet 320 in response touch point 910 contacting touch sensor pad 300. Strip identification module 404 may conduct a parallel search of the strips, or may use other searching techniques to identify first strip 1010 corresponding to touch point 910. Strips of second resistive sheet 320 may be energized individually or in groups to identify first strip 1010, and strip identification module 404 may determine whether a voltage increase is detected in strips of first resistive sheet 310. If there is a touch point along an energized strip, then the energized strip will apply a voltage to strips of first resistive sheet 310 and cause a voltage increase in strips of first resistive sheet 310. If a voltage increase is detected on strips of first resistive sheet 310, then first strip 1010 may be identified by strip identification module 404.

In step 806, strip identification module 404 of controller 330 identifies second strip 1110 of second resistive sheet 320. Strip identification module 404 may conduct a parallel search of the strips, or may use other searching techniques to identify second strip 1110 where touch point 910 contacts touch sensor pad 300. Strip 1010 of first resistive sheet 310 may be energized to identify second strip 1110, and strip identification module 404 may determine whether a voltage increase is detected on second strip 1110 of second resistive sheet 320. If there is a touch point along an energized strip, then the energized strip will apply a voltage to second strip 1110 (and possibly other strips) and cause a voltage increase. If a voltage increase is detected on second strip 1110, then second strip 1110 may be identified by strip identification module 404.

In step 808, voltage measurement module 406 of controller 330 measures a first voltage of second strip 1110 applied by first strip 1010 while the strips are in contact in response to touch point 910. The first voltage may be measured by applying a voltage gradient between terminals 1012 and 1014 (see FIG. 10) of first strip 1010, and measuring the voltage of second strip 1110. The first voltage may be correlated to a coordinate of touch point 910 in a second dimension (e.g., a y-coordinate).

In step 810, voltage measurement module 406 of controller 330 measures a second voltage of first strip 1010 applied by second strip 1110 while the strips are in contact in response to touch point 910. The second voltage may be measured by applying a voltage gradient between terminals 1112 and 1114 (see FIG. 11) of second strip 1110, and measuring the voltage of second strip 1110. The first voltage may be correlated to a coordinate of touch point 910 in a first dimension (e.g., an x-coordinate).

In step 812, coordinate determination module 408 of controller 330 determines coordinates of touch point 910 based on the first voltage and the second voltage. In step 814, touch detection module 402 determines whether there are more touches on touch sensor pad 300. If there are no additional touches on touch sensor pad 300, then processing by controller 330 ends. Otherwise, processing by controller 330 loops back to step 804 to determine coordinates for a second touch point 920. Controller 330 may identify third strip 1020 and fourth strip 1120 and measured associated voltages of the strips. From this information, coordinate determination module 408 of controller 330 may determine coordinates of touch point 920.

Figure 12:
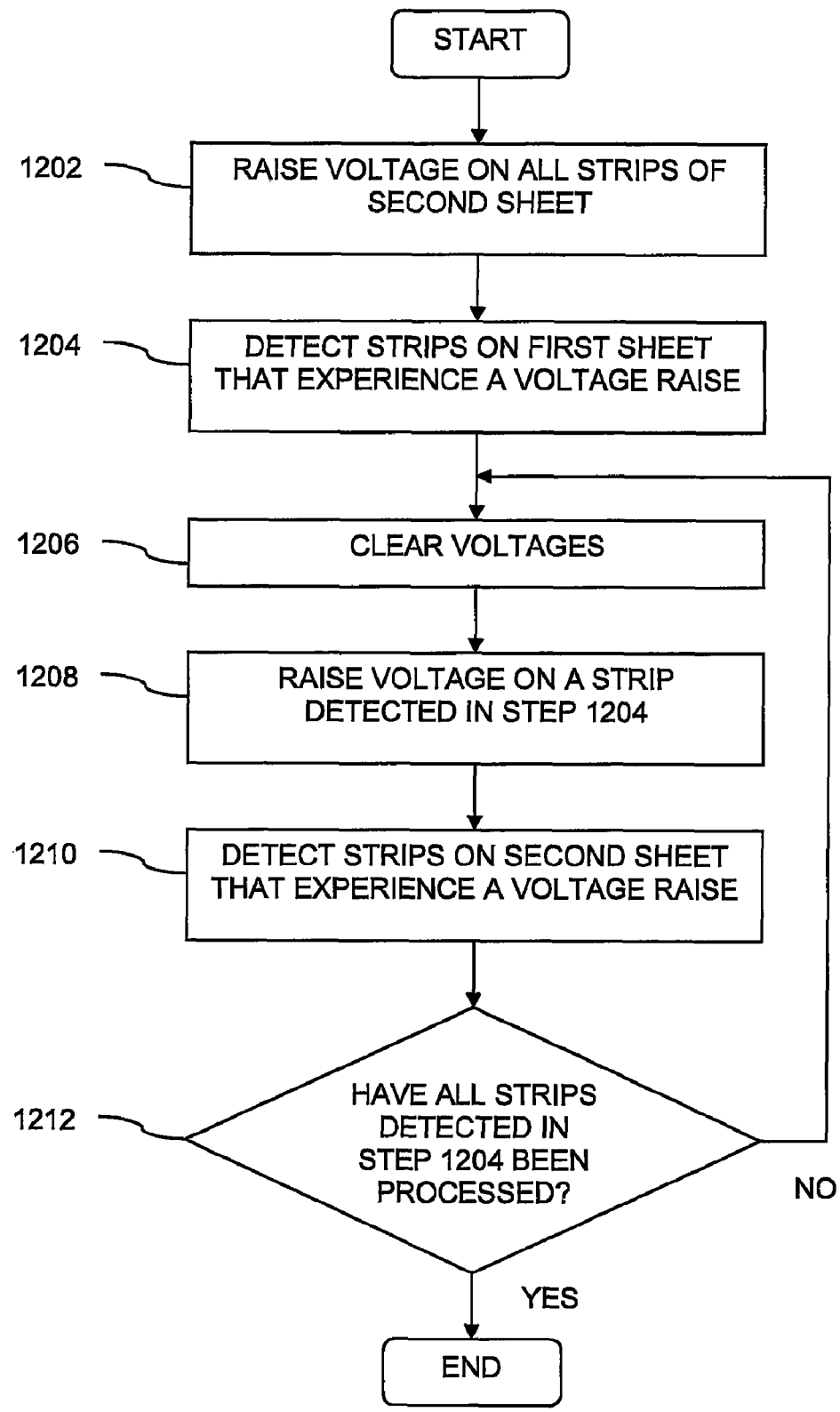
FIG. 12 illustrates a flow chart of a method for conducting a parallel search of a plurality of resistive sensor strips to identify sensor strips with touch points in an exemplary embodiment of the invention.

Parallel searching is an efficient technique for identifying strips of first resistive sheet 310 or second resistive sheet 320 which have associated touches. FIG. 12 illustrates a flow chart of method 1200 for conducting a parallel search of a plurality of resistive sensor strips to identify all sensor strips with a touch point in an exemplary embodiment of the invention. The steps of method 1200 will be discussed in regard to touch sensor pad 300 in FIGS. 3-4. The steps of method 1200 are not all-inclusive, and may include other steps not shown for the sake of brevity.

To begin processing of method 1200, touch detection module 402 determines that there is at least one touch on touch sensor pad 300. In step 1202 strip identification module 404 raises the voltage on all of the strips of second resistive sheet 320. In step 1204, strip identification module 404 detects the strips of first resistive sheet 310 that experience a voltage increase. In step 1206, strip identification module 404 clears the voltages on all strips. In step 1208, strip identification module 404 raises the voltage of one of the strips of first resistive sheet 310 identified in step 1204. In step 1210, strip identification module 404 detects the strips of second resistive sheet 320 that experience a voltage increase to identify the intersecting strips experiencing a touch point. In step 1212, if there are additional strips identified in 1204 that have not been processed, then strip identification module 404 loops to step 1206. Otherwise, processing by method 1200 ends having identified all strip intersections experiencing a touch.

Figures 13, 14:
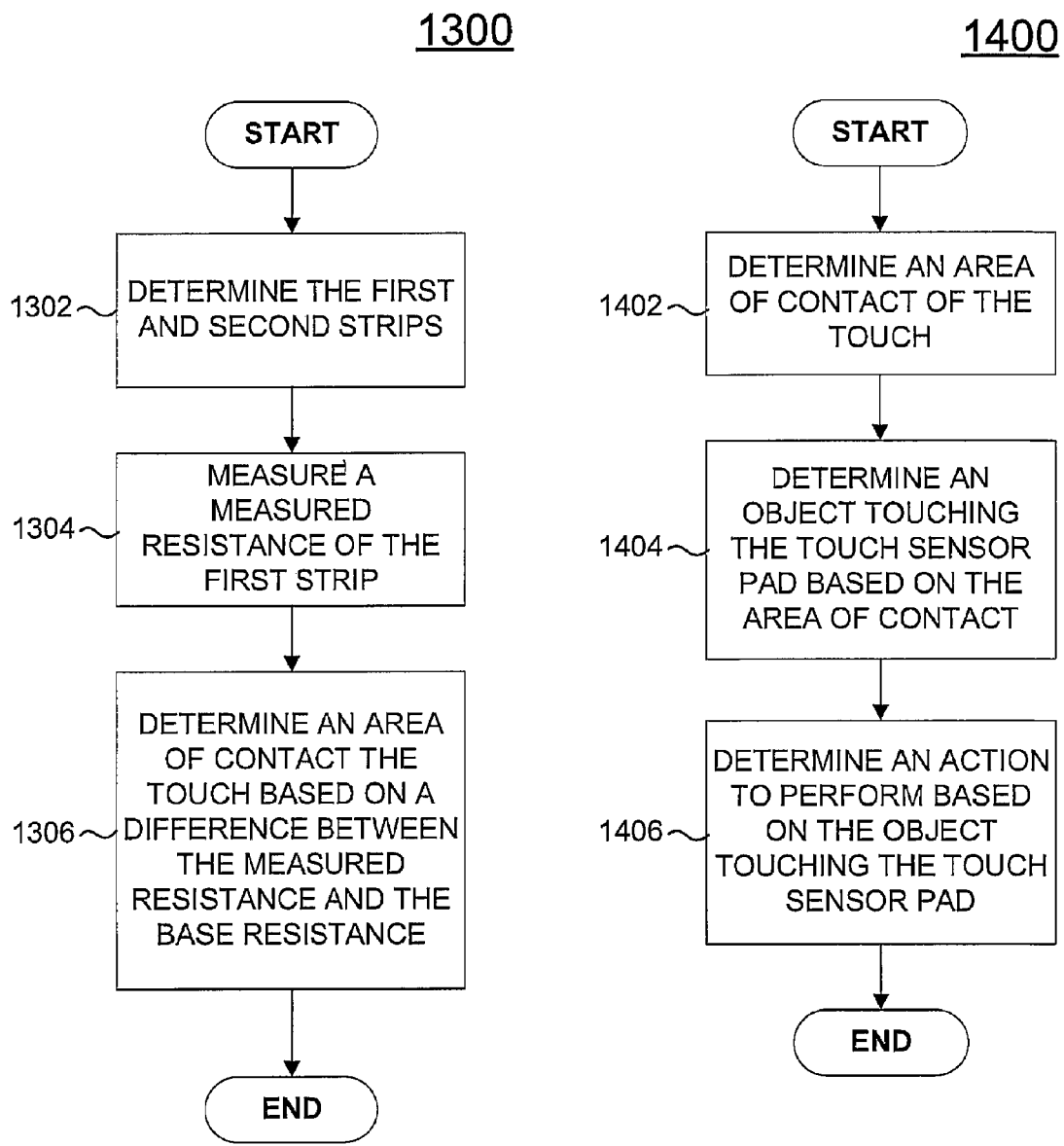
FIG. 13 illustrates a method for determining an area of contact of a touch by an object touching a touch sensor pad in an exemplary embodiment of the invention.
FIG. 14 illustrates a method for determining an action to perform based on an area of contact of a touch in an exemplary embodiment of the invention.

It is a particular problem for prior art systems to determine the size and/or pressure of a touch point, and differentiate between different types of objects (e.g., a pen, stylus, hand, finger, etc.) contacting a touch sensor pad. However, touch sensor pad 300 of FIG. 3 may be utilized to determine an area or size of an object contacting touch sensor pad 300, or a pressure of an object applied to touch sensor pad 300 by the object. FIG. 13 illustrates a method 1300 for determining an area of contact of a touch by an object contacting a touch sensor pad in an exemplary embodiment of the invention. The steps of method 1300 are described in reference to touch sensor pad 300 illustrated in FIGS. 3-4. The steps of method 1300 are not all-inclusive, and may include other steps not shown for the sake of brevity.

In step 1302, strip identification module 404 of controller 330 determines a first strip of first resistive sheet 310 and a second strip of a second resistive sheet 320 corresponding to a touch on touch sensor pad 300. In step 1304, strip resistance measurement module 410 measures a measured resistance (Rm) of the first strip during contact between the first strip and the second strip in response to the touch. The measured resistance is used to determine a resistance shift (Rs). The resistance shift (Rs) measures the affect on the overall resistance of a strip in response to a touch (i.e., physical contact between the two strips).

Each strip has a resistance per unit length. For example, first resistive sheet 310 may have a resistance R1/unit length, and second resistive sheet 320 may have a resistance R2/unit length. Therefore, each strip has an overall resistance which is equal to (R/unit length)*(the total length of the strip), e.g., a base resistance (Rb). The physical contact between first resistive sheet 310 and second resistive sheet 320 forms two resistors in parallel over the area of a touch. Thus, the overall resistance of a strip on either of first resistive sheet 310 or second resistive sheet 320 during physical contact will be reduced by (R1*R2)/(R1+R2) multiplied by the length of the touch area, i.e. the measured resistance (Rm). The resistance shift (Rs) is equal to the difference between the base resistance (Rb) and the measured resistance (Rm) of the first strip.

If both first resistive sheet 310 and second resistive sheet 320 have the same resistance per unit length, then the overall affect on the measured resistance of either sheet will be R/2 multiplied by the length of the touch area. However, if the resistance per unit length of one sheet (e.g., first resistive sheet 310) is relatively smaller than the resistance per unit length of the other sheet (e.g., second resistive sheet 320), then the percentage affect on the measured resistance of the sheet having the larger resistance per unit length will be relatively larger, and creates a larger resistance shift (Rs). Thus, the resistance may be measured from the strip having the larger resistance per unit length to more easily determine the resistance shift (Rs)

In step 1306, strip resistance measurement module 410 determines an area of contact of the touch based on a difference between the measured resistance (Rm) and the base resistance (Rb) of the first strip, i.e., the resistance shift (Rs) of the first strip in response to the touch. Because the resistance shift corresponds to a resistance per unit length, the value may be used to determine a length of contact along the strip, and thus be correlated to an area of contact of the touch along the first strip.

When first resistive sheet 310 and second resistive sheet 320 make physical contact, the contact area will be greater if the object causing the contact is larger. A larger area of contact correlates to a lower overall resistance of an energized strip (e.g., a larger resistance shift). Therefore, a relatively large object contacting touch sensor pad 300 will lower the overall resistance of a strip more than a relatively smaller object. Further, an object pressing harder on touch sensor pad 300 will create a larger area of contact, which may be used to determine a pressure of contact applied to touch sensor pad 300 by an object.

The area of touch may be used to determine an action to perform for the touch. FIG. 14 illustrates a method 1400 for determining an action to perform based on an area of contact of a touch in an exemplary embodiment of the invention. The steps of method 1400 are described in reference to touch sensor pad 300 illustrated in FIGS. 3-4. The steps of method 1400 are not all-inclusive, and may include other steps not shown for the sake of brevity.

In step 1402, strip resistance measurement module 410 of controller 330 determines an area of contact of a touch by an object on touch sensor pad 300. This may be done as described in method 1300 of FIG. 13. In step 1404, object determination module 412 identifies a type of object touching touch sensor pad 300 at specified coordinates based on the area of contact of the touch at the coordinates. Object determination module 412 may have a table listing various objects likely to be used on touch sensor pad 300 and the objects associated size range. Object determination module 412 may then look up the area of contact of the touch determined in step 1402 in the table to determine the object. Exemplary objects include pens, pencils, styluses, fingers, palms and wrists of users.

In step 1406, object determination module 412 determines an action to perform based on the type of object contacting touch sensor pad 300. For example, object determination module 412 may determine that a touch indicates a button press if the object is determined to be a stylus, while the action may be a keystroke if the object is determined to be a finger of the user. Object determination module 412 may also determine that no action is to be performed depending on whether the type of object is likely to cause inadvertent touching on touch sensor pad 300, such as a wrist touching a bottom edge of touch sensor pad 300 while a user is typing.

A pressure of contact of a touch applied by an object to touch sensor pad 300 may be used to determine an action to perform based on the touch. For example, if regions of touch sensor pad 300 represent a virtual keyboard, then a user may place a finger over a region of touch sensor pad 300 representing a single key, and view an indication of the key on the screen. In this scenario, the user may apply a relatively low pressure to touch sensor pad 300. By contrast, the user may apply a relatively higher pressure to touch sensor pad 300 to indicate an actual keystroke. In other cases, controller 330 may determine that a touch was inadvertent based on a relatively low pressure applied by the object. Using pressure sensor determinations, controller 330 may differentiate between these intended actions by a user.

Figure 15:
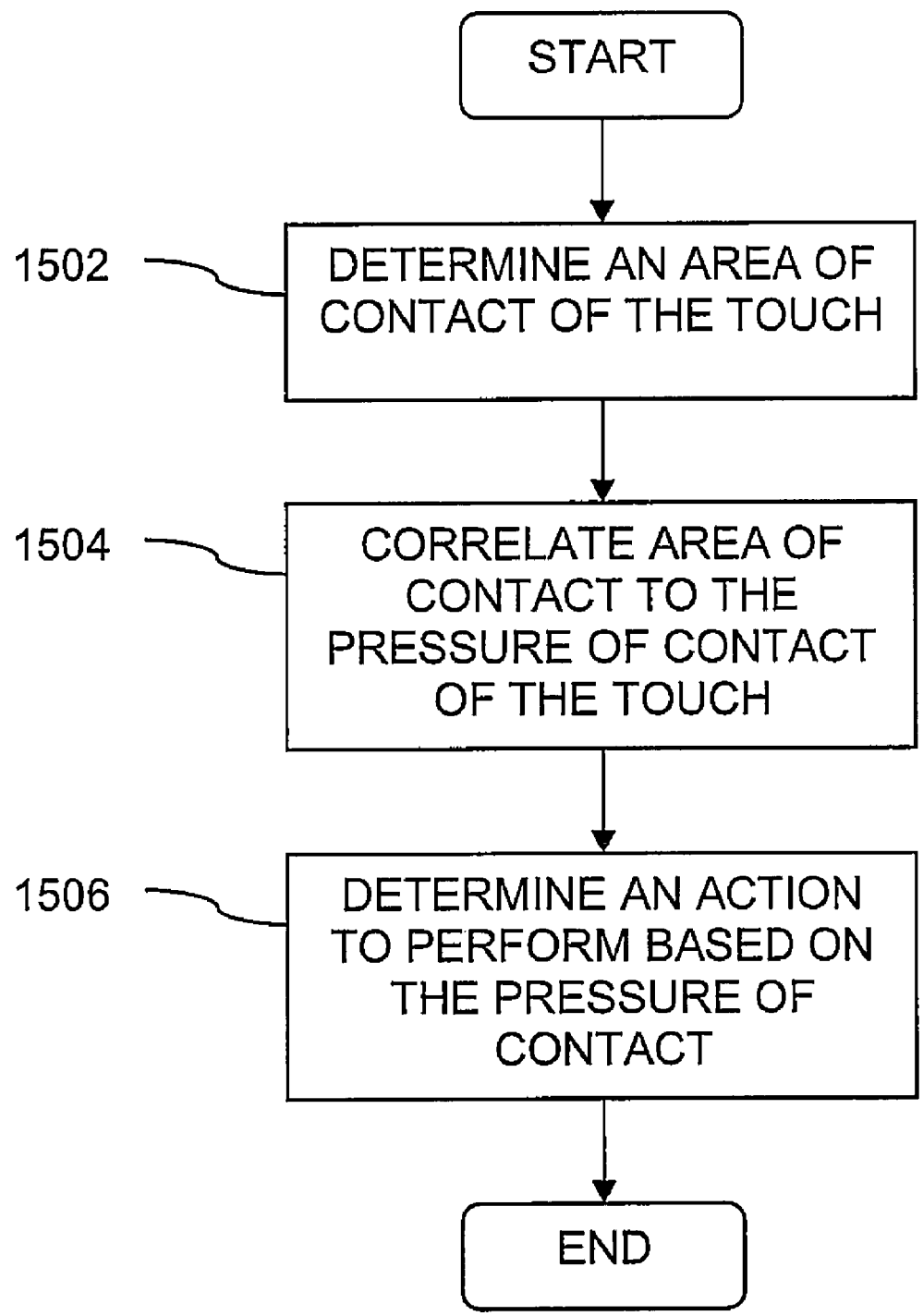
FIG. 15 illustrates a method for determining an action to perform based on a pressure of contact of a touch in an exemplary embodiment of the invention.

FIG. 15 illustrates a method 1500 for determining an action to perform based on a pressure of contact of a touch in an exemplary embodiment of the invention. The steps of method 1500 are described in reference to touch sensor pad 300 illustrated in FIGS. 3-4. The steps of method 1500 are not all-inclusive, and may include other steps not shown for the sake of brevity.

In step 1502, strip resistance measurement module 410 of controller 330 determines an area of contact of a touch by an object on touch sensor pad 300. This may be done as described in method 1300 of FIG. 13. In step 1504, object and pressure determination module 412 identifies the pressure applied by the object touching touch sensor pad 300 at specified coordinates based on the area of contact of the touch at the coordinates. In step 1504, object determination module 412 determines an action to perform based on the pressure of contact of the touch applied by the object to touch sensor pad 300. Object determination module 412 may use look up tables, fuzzy logic, etc., to determine the action to perform based on the pressure of the touch.

The overall resistance value of a strip may also be used to correct for errors caused when determining the location of simultaneous touches along the same strip. When a user touches simultaneously along the same strip, an error occurs due to the resistance shift caused by the second touch. A measured resistance shift (Rs) of the strips on the other resistive layer may be used to correct this resulting error.

Figure 16:
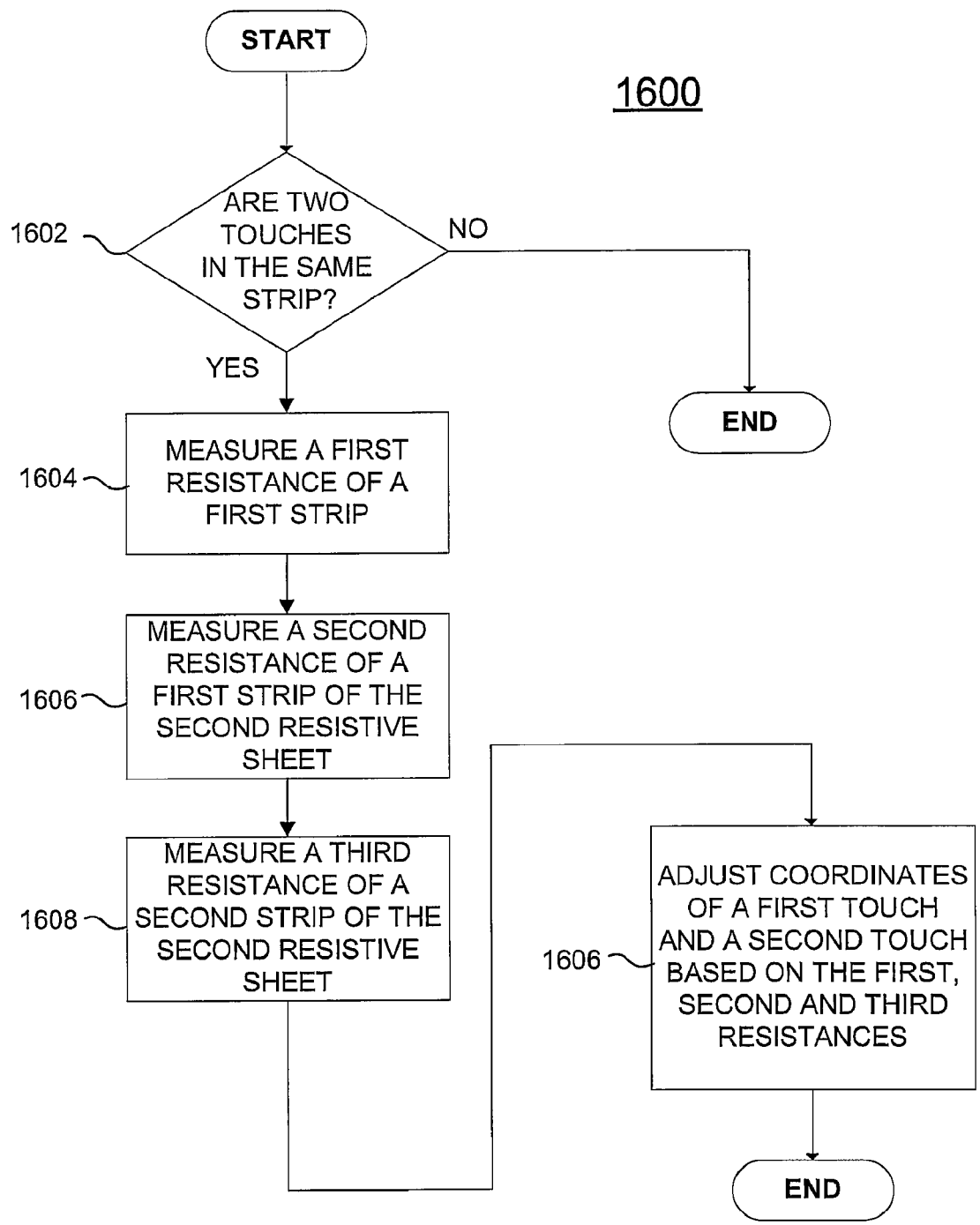
FIG. 16 illustrates a method for correcting coordinates of two touches along the same strip in an exemplary embodiment of the invention.

FIG. 16 illustrates a method 1600 for correcting coordinates of two touches along the same strip in an exemplary embodiment of the invention. The steps of method 1600 are described in reference to touch sensor pad 300 illustrated in FIGS. 3-4. The steps of method 1600 are not all-inclusive, and may include other steps not shown for the sake of brevity.

In step 1602, controller 330 determines whether two touch points are along the same strip. If controller 330 determines that two touch points are along the same strip, then processing continues in step 1604. Otherwise, processing of method 1600 ends.

Figure 17:
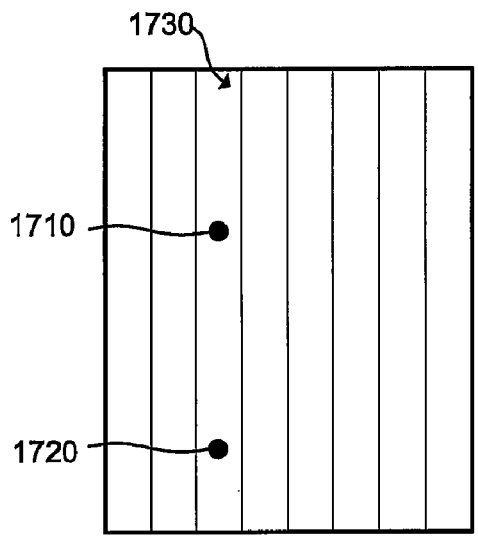
FIG. 17 illustrates a top view of a first resistive sheet of the touch sensor pad of FIG. 3 in an exemplary embodiment of the invention.

FIG. 17 illustrates a top view of a first resistive sheet 310 of touch sensor pad 300 of FIG. 3 in an exemplary embodiment of the invention. More specifically, FIG. 17 illustrates a touch point 1710 and a touch point 1720 along the same strip 1730 of first resistive sheet 310. Vertical lines represent boundaries between strips (e.g., strip 1730) of first resistive sheet 310. Horizontal lines represent boundaries between strips (e.g., strip 1740 and strip 1750) of second resistive sheet 320 (not visible in FIG. 17). The multiple touch points on strip 1730 cause an error in the coordinate determination of each touch which may be corrected using measured resistances of strip 1740 and strip 1750 of second resistive sheet 320 contacting first resistive sheet 310 in response to touch point 1710 and touch point 1720.

In step 1604, strip resistance measurement module 410 measures a first resistance of strip 1740, which is a strip of second resistive sheet 320 contacting strip 1730 in response to touch point 1710. In step 1606, strip resistance measurement module 410 measures a second resistance of strip 1750, which is a strip of second resistive sheet 320 contacting strip 1730 in response to touch point 1720. In step 1608, controller 330 adjusts coordinates of touch point 1710 and touch point 1720 based on the first resistance and the second resistance.

Because of a resistance shift caused by the contact between strip 1750 and strip 1730 in response to touch point 1720, the coordinates determined for touch point 1710 will actually shift towards touch point 1720. The same error condition will occur for touch point 1720 based on the resistance shift caused by the contact between strip 1730 and strip 1740. The resistance shift for touch point 1710 is based on the contact area of touch point 1720. For example, if strip 1730 is ten inches long, and touch point 1720 has a one inch area of contact, then the resistance shift caused by touch point 1720 will cause a 5% resistance shift to touch point 1710. Thus, the coordinates for touch point 1710 will be adjusted by 5% by controller 330 in one dimension because of this resistance shift. A similar process is also performed for touch point 1720 based on the resistance shift caused by touch point 1710. These error conditions may also occur on second resistive sheet 320, and may be corrected in a similar manner by measuring resistances of two strips of first resistive sheet 310.

It is often desirable to increase the resolution of a touch sensor pad for more accurate detection of touches. For example, higher resolution is beneficial when capturing user drawn images, such as a buyer signing a credit card machine at a retail store. The possible range of a signal from any sensing strip of touch sensor pad 300 is the total voltage range of the presently energized layer (Vmax) divided by the number of strips on the presently sensing layer (Nsense). Increasing the voltage range of the presently energized layer may be insufficient due to limitations of measuring equipment For example, if measuring equipment has a range of Vadc, then Vmax may not be higher than Vadc. However, the subsequently described method allows for an increased resolution across a single strip without the problems previously described.

Figure 18:
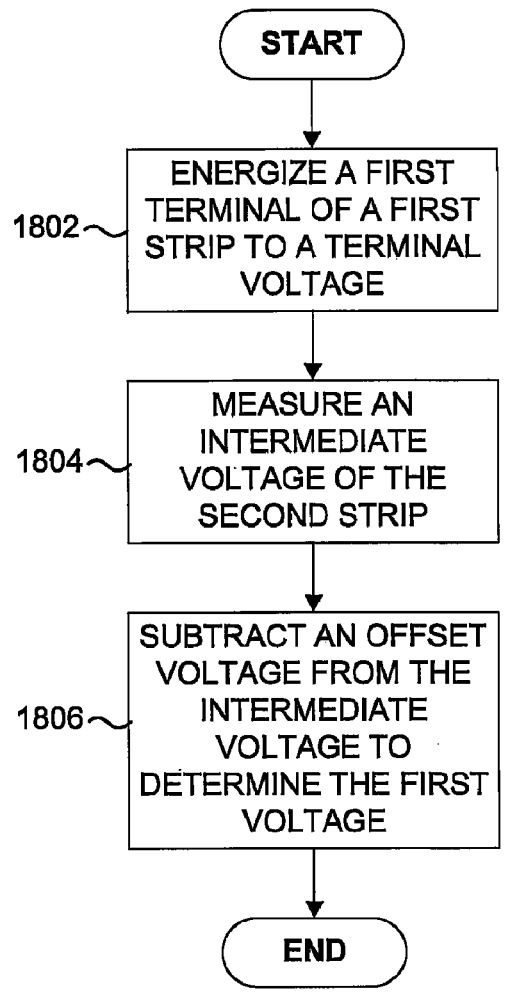
FIG. 18 illustrates a method for increasing the resolution of a touch sensor pad in an exemplary embodiment of the invention.

FIG. 18 illustrates a method 1800 for increasing the resolution of a touch sensor pad in an exemplary embodiment of the invention. The steps of method 1800 are described in reference to touch sensor pad 300 of FIGS. 3-4. The steps of method 1800 are not all-inclusive, and may include other steps not shown for the sake of brevity.

In step 1802, controller 330 energizes a first terminal (e.g., terminal 314) of a first strip (e.g., first strip 312) of first resistive sheet 310 to generate a terminal voltage (Vmax) to generate a voltage gradient along first strip 312. Terminal 314 may be energized to a voltage Vmax which may be higher than Vadc. In step 1804, controller 330 measures an intermediate voltage of second resistive sheet 320 applied to second resistive sheet 320 by first strip 312.

In step 1806, controller 330 subtracts an offset voltage from the intermediate voltage of second resistive sheet 320 to determine a voltage corresponding to a coordinate of a touch in one dimension. Assume that second resistive sheet 320 has Nsense strips, with each strip sequentially numbered from zero. Assume further that Sx equals the current index value of a sensing strip (e.g., strip 322 of second resistive sheet 320). A margin voltage (Vmargin) may be desired to insure both sides of a sensing strip are within the range of the measuring equipment, for example 0.5 V on each side of a strip may be used.

The offset voltage may be determined based on the terminal voltage (Vmax) divided by a product of a number of the first plurality of resistive sensor strips (Nsense) times an index value of the second strip (Sx). Thus, Voff=(Vmax/Nsense)*Sx or Voff=((Vmax/Nsense)*Sx)−Vmargin. A net signal transmitted to the measuring electronics (Vsignal) may then range from Vmargin to (Vmax/Nsense)−Vmargin. If the voltage range supported by the measuring electronics is Vadc, then strip 312 may be energized to Vmax=Nsense*(Vadc−(2*Vmargin)). If Vmargin=Vadc/10, then the resolution may be Nsense*0.8 times greater than a standard resistive controller.

Resistive touch sensors often require calibration because they tend to draft with temperature and/or age. The calibration process often requires operator assistance in order to hit targets shown on a display to correlate physical location to a measured signal. However, controller 330 of touch sensor pad 300 may automatically ascertain physical locations and automatically calibrate touch sensor pad 300 without operator assistance.

Figures 19, 20:
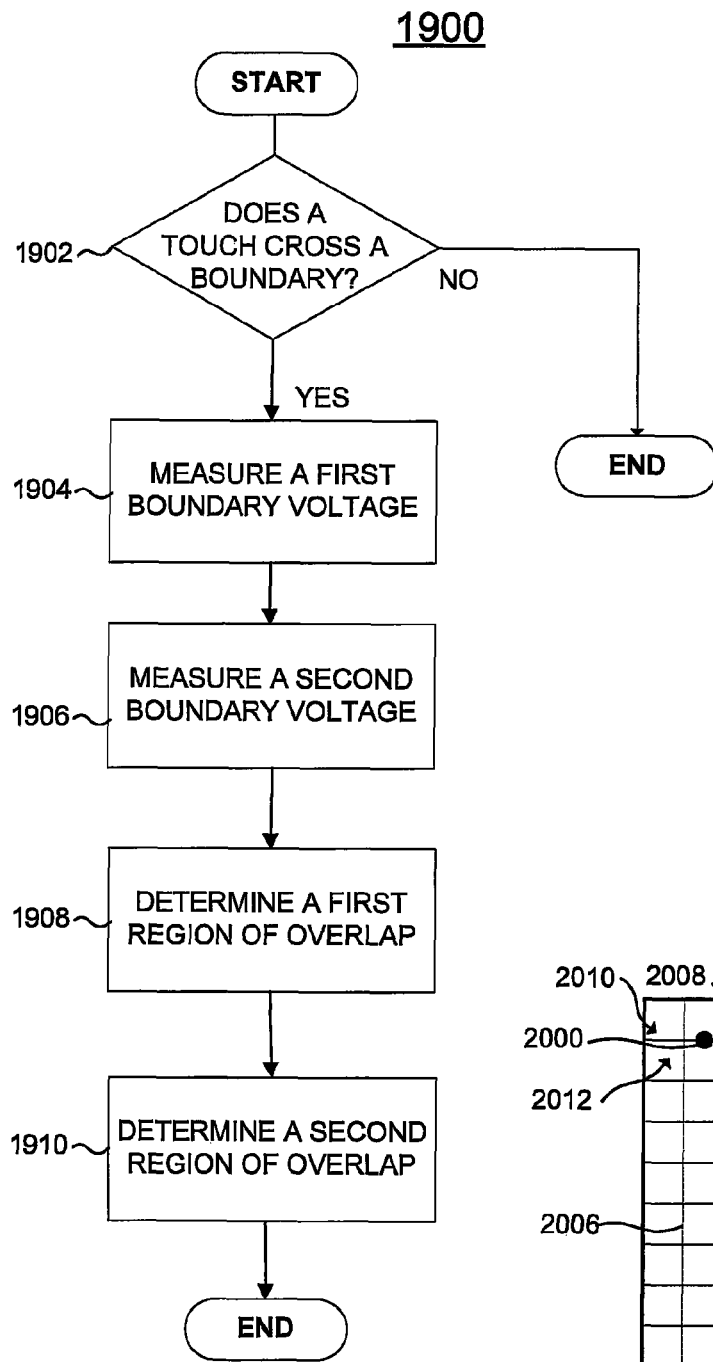
FIG. 19 illustrates a method for automatically calibrating a touch sensor pad in an exemplary embodiment of the invention.
FIG. 20 illustrates a top view of the touch sensor pad of FIG. 3 in an exemplary embodiment of the invention.

FIG. 19 illustrates a method 1900 for automatically calibrating a touch sensor pad in an exemplary embodiment of the invention. The steps of method 1900 are described in reference to touch sensor pad 300 of FIGS. 3-4. The steps of method 1900 are not all-inclusive, and may include other steps not shown for the sake of brevity.

In step 1902, controller 330 tracks a minimum voltage and a maximum voltage for each resistive strip of first resistive sheet 310 and second resistive sheet 320. The minimum voltage represents a first physical location of a first boundary of a strip, and the second boundary represents a second physical location of a second boundary of the strip.

FIG. 20 illustrates a top view of touch sensor pad 300 of FIG. 3 in an exemplary embodiment of the invention. More specifically, FIG. 20 illustrates a grid square 2000 formed by the intersection of one strip of first resistive sheet 310 (not visible in FIG. 20) and one strip of second resistive sheet 320 (not visible in FIG. 20). Grid square 2000 has a top boundary 2002, a bottom boundary 2004, a left boundary 2006 and a right boundary 2004. These boundaries represent the edges of each strip of first resistive sheet 310 and second resistive sheet 320. If the positive most voltages of each strip are at the top and left side of touch sensor pad 300, then the maximum measured voltages of the strips represent boundaries 2002 and 2006, and the minimum measured voltages represent boundaries 2004 and 2008. If a touch crosses a boundary between two strips (e.g., touch 2010 crossing boundary 2004), then controller 330 may determine the minimum and maximum voltages for each of two different strips based on the last voltage values measured for each strip. Thus, for touch point 2010, controller 330 may determine the maximum voltage for a vertical strip of grid square 2006, which represents boundary 2004. Controller 330 may then interpolate between the maximum and minimum voltages along a strip to determine a coordinate of a touch point.

One way of determining these minimum and maximum voltages is to initially have an operator draw lines all around the surface of touch sensor pad 300. This allows controller 330 to initially determine a sufficient initial representation of the minimum and maximum voltages for each strip of first resistive sheet 310 and second resistive sheet 320. These voltages can be correlated to known physical locations (e.g., boundaries between strips) of touch sensor pad 300. Then, as additional touch points are processed during normal operation, controller 330 may compare measured voltages for a strip against known minimum and maximum voltages for the strip. If the measured voltage for a touch point exceeds the maximum tracked voltage for the strip, then the tracked maximum voltage can be updated to reflect the newly determined maximum voltage. A corresponding physical location can be associated with this maximum voltage. A similar process may be used to update the minimum tracked voltages for a strip for calculation of coordinates for a touch point.

In step 1904, controller 330 calculates the coordinates of a touch point by interpolating between the first and second physical locations of the first and second boundaries based on where the second voltage falls between the minimum and maximum voltages. For example, assume that the minimum voltage of a strip is 2V and the maximum voltage is 3 V. If the measured voltage is 2.5 V, then the physical location is halfway between the physical locations associated with the minimum voltage and the maximum voltage of the strip. This process may be done in both a horizontal and vertical direction to determine coordinates of a touch. Thus, advantageously controller 330 may automatically calibrate touch sensor pad 300 using method 1900 without ongoing operator assistance.

Controller 330 may be connected to ends of sensor strips of first resistive sheet 310 and second resistive sheet 320 utilizing low resistance contacts. If contacts do not traverse the entire width of a strip, then a voltage gradient along a strip will not be linear. Preferably, this non-linearity is accounted for to report accurate location data of touches on touch sensor pad 300.

Figure 21:
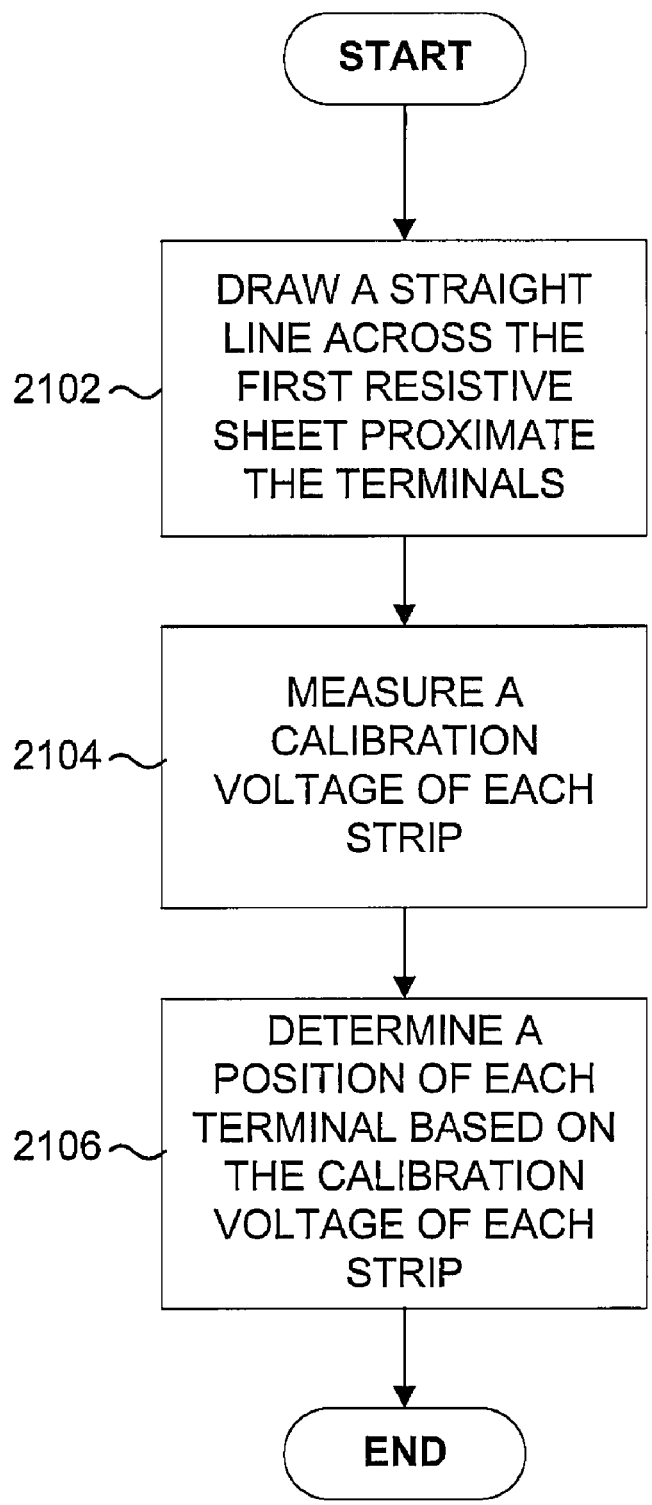
FIG. 21 illustrates a method for accommodating non-linearities of a touch sensor pad due to manufacturing limitations in an exemplary embodiment of the invention.

FIG. 21 illustrates a method 2100 for accommodating non-linearities due to manufacturing limitations in an exemplary embodiment of the invention. The steps of method 2100 are described in reference to touch sensor pad 300 of FIGS. 3-4. The steps of method 2100 are not all-inclusive, and may include other steps not shown for the sake of brevity.

In step 2102, a substantially straight line is drawn across first resistive sheet 310 proximate terminals (e.g., terminals 314 and 316) on the ends of the strips. A terminal of known geometry may be used during manufacturing that fits within the width of a single strip (e.g., strip 312). The line may be drawn around an edge of touch sensor pad 300 near the terminals. As the line is drawn around the edge, the line will cross each strip near its associated terminal.

In step 2104, controller 330 measures a sequence of calibration voltages of each of the strips of first resistive sheet 310 in response to drawing the line. The sequence of calibration voltages may be determined in a similar manner as described by step 808 of FIG. 8. In step 2106, controller 330 may determine a position of each of the terminals of first resistive sheet 310 based on the sequence of calibration voltages of each of the strips of the first resistive sheet 310.

A position error of a strip can be calculated and subtracted from subsequently reported location data. This same process may be performed on second resistive sheet 320 to determine position errors for strips of second resistive sheet 320. Thus, controller 330 may adjust coordinates of a touch determined by method 800 based on the positions errors determined by method 2100. The position error determination for a strip is only required once, and all subsequent location determinations may be corrected based on the position error determination of method 2100.

Although specific embodiments were described herein, the scope of the invention is not limited to those specific embodiments. The scope of the invention is defined by the following claims and any equivalents therein.

I claim:

1. A method for determining coordinates of simultaneous touches on a touch sensor pad, the touch sensor pad including a first plurality of resistive sensor strips on a first resistive sheet and a second plurality of resistive sensor strips on a second resistive sheet, the method of determining comprising the steps of:
    determining coordinates of each of the multiple locations of touch independently of other touches, the determining step for a touch comprising:
        identifying a first strip of the first plurality of resistive sensor strips of the first resistive sheet that is physically contacting a second strip of the second plurality of resistive sensor strips of the second resistive sheet in response to the touch;
        identifying the second strip;
        energizing terminals of the first strip to a first terminal voltage to generate a voltage gradient along the first strip;
        determining a first offset voltage by assigning each of the second plurality of resistive sensor strips a sequential index value wherein the first offset voltage is a function of the first terminal voltage times an index value of the second strip divided by a number of the second plurality of resistive sensor strips;
        determining a first measured voltage wherein the first measured voltage is the voltage of the second strip applied by the first strip while in contact with the second strip in response to the touch minus the first offset voltage;
        clearing the voltages;
        energizing terminals of the second strip to a second terminal voltage to generate a voltage gradient along the second strip;
        determining a second offset voltage by assigning each of the first plurality of resistive sensor strips a sequential index value wherein the second offset voltage is a function of the second terminal voltage times an index value of the first strip divided by a number of the first plurality of resistive sensor strips;
        determining a second measured voltage wherein the second measured voltage is the voltage of the first strip applied by the second strip while in contact with the first strip in response to the touch; minus the second offset voltage;
        determining coordinates of the touch based on the first measured voltage, taken together with the index value of the second strip, the second measured voltage, and the index value of the first strip.

2. The method of claim 1, wherein the first strip has a first base resistance and the second strip has a second base resistance and a determining step for a touch further comprises:
    measuring a first measured resistance of the first strip during contact between the first strip and the second strip in response to the touch;
    measuring a second measured resistance of the second strip during contact between the first strip and the second strip in response to the touch; and
    determining an area of contact of the touch based on differences between the measured resistances and the base resistances of the first and second strips.

3. The method of claim 2 further comprising:
    identifying a type of object contacting the touch sensor pad at the coordinates of the touch based on the area of contact; and
    determining an action corresponding to the coordinates based on the type of object contacting the touch sensor pad.

4. The method of claim 2 further comprising:
    correlating a pressure to the area of contact applied by an object to the touch sensor pad at the coordinates of the touch; and
    determining an action corresponding to the coordinates based on the pressure of the object contacting the touch sensor pad.

5. The method of claim 1, wherein the method for identifying first strips and second strips in physical contact in response to touches comprises the steps of:

grouping the resistive sensor strips on a second sheet into a first half and a second half;
raising the voltage of the resistive sensor strips in the first half;
pulling to ground the ends of all the resistive sensor strips on a first sheet furthest from the first half;
detecting the ends of all the resistive sensor strips on a first sheet closest to the first half that experience a voltage rise;
clearing the voltages;
raising the voltage of the resistive sensor strips in the second half;
pulling to ground the ends of all the resistive sensor strips on a first sheet furthest from the second half;
detecting the ends of all the resistive sensor strips on a first sheet closest to the second half that experience a voltage rise;
clearing the voltages;
raising the voltage of a detected resistive sensor strip on the first sheet;
pulling to ground the ends of all the resistive sensor strips on a second sheet furthest from the detected resistive sensor strip;
detecting the ends of the resistive sensor strips on a second sheet closest to the detected resistive sensor strip that experience a voltage rise; and
repeating clearing the voltages, raising the voltage of a detected resistive sensor strips on the first sheet, pulling to ground the furthest ends of the resistive sensor strips on a second sheet, and detecting the voltage rise on the closest ends of the resistive sensor strips on a second sheet until all the detected resistive sensor strips on a first sheet have been processed.

6. The method of claim 1 further comprising:
tracking the minimum and maximum first location voltages, wherein the minimum voltage occurs at a first physical location of a first boundary of the second strip, and the maximum voltage occurs at a second physical location of a second boundary of the second strip, and
calculating the coordinates of the touch along the first strip by interpolating between the first and second physical locations of the first and second boundaries based on where the first location voltage falls between the minimum and maximum voltages; and
tracking the minimum and maximum second location voltages, wherein the minimum voltage occurs at a first physical location of a first boundary of the first strip, and the maximum voltage occurs at a second physical location of a second boundary of the first strip, and calculating the coordinates of the touch along the second strip by interpolating between the first and second physical locations of the first and second boundaries based on where the second location voltage falls between the minimum and maximum voltages.

7. An apparatus for determining coordinates of simultaneous touches on a touch sensor pad, the apparatus comprising:
an interface coupled to a first plurality of resistive sensor strips on a first resistive sheet of the touch sensor pad and coupled to a second plurality of resistive sensor strips on a second resistive sheet of the touch sensor pad; and
a processing system coupled to the interface and adapted to determine coordinates of each of the multiple locations of touch independently of other touches, the processing system adapted to:
identify a first strip of the first plurality of resistive sensor strips of the first resistive sheet that is physically contacting a second strip of the second plurality of resistive sensor strips of the second resistive sheet in response to the touch;
identify the second strip;
energize the terminals of the first strip to a first terminal voltage to generate a voltage gradient along the first strip;
determine a first offset voltage, wherein each of the second plurality of resistive sensor strips are assigned a sequential index value, and wherein the first offset voltage is a function of the first terminal voltage times an index value of the second strip divided by a number of the second plurality of resistive sensor strips;
determine a first measured voltage, wherein the first measured voltage is the voltage of the second strip applied by the first strip minus the first offset voltage;
clear the voltages;
energize the terminals of the second strip to a second terminal voltage to generate a voltage gradient along the second strip;
determine a second offset voltage, wherein each of the first plurality of resistive sensor strips are assigned a sequential index value, and wherein the second offset voltage is a function of the second terminal voltage times an index value of the first strip divided by a number of the first plurality of resistive sensor strips;
determine a second measured voltage, wherein the second measured voltage is the voltage of the second strip applied by the first strip minus the second offset voltage; and
determine coordinates of the touch based on the first measured voltage, taken together with the index value of the second strip, the second measured voltage, and the index value of the first strip.

8. The apparatus of claim 7, wherein the first strip has a first base resistance and the second strip has a second base resistance and the processing system is further adapted to:
measure a measured resistance of the first strip during contact between the first strip and the second strip in response to the touch;
measure a measured resistance of the second strip during contact between the first strip and the second strip in response to the touch; and
determine an area of contact of the touch based on a difference between the measured resistances and the base resistances.

9. The apparatus of claim 8, wherein the processing system is further adapted to:
identify a type of object contacting the touch sensor pad at the coordinates of the touch based on the area of contact; and
determine an action corresponding to the coordinates based on the type of object contacting the touch sensor pad.

10. The apparatus of claim 8, wherein the processing system is further adapted to:
identify the pressure of an object contacting the touch sensor pad at the coordinates of the touch based on the area of contact; and
determine an action corresponding to the coordinates based on the pressure of an object contacting the touch sensor pad.

11. The apparatus of claim 7, wherein the processing system is further adapted to:
group the resistive sensor strips on a second sheet into a first half and a second half;

raise the voltage of the resistive sensor strips in the first half;
pull to ground the ends of all the resistive sensor strips on a first sheet furthest from the first half;
detect the ends of all the resistive sensor strips on a first sheet closest to the first half that experience a voltage rise;
clear the voltages;
raise the voltage of the resistive sensor strips in the second half;
pull to ground the ends of all the resistive sensor strips on a first sheet furthest from the second half;
detect the ends of all the resistive sensor strips on a first sheet closest to the second half that experience a voltage rise;
clear the voltages;
raise the voltage of a detected resistive sensor strip on the first sheet;
pull to ground the ends of all the resistive sensor strips on a second sheet furthest from the detected resistive sensor strip;
detect the ends of the resistive sensor strips on a second sheet closest to the detected resistive sensor strip that experience a voltage rise; and
repeat clearing the voltages, raising the voltage of a detected resistive sensor strips on the first sheet, pulling to ground the furthest ends of the resistive sensor strips on a second sheet, and detecting the voltage rise on the closest ends of the resistive sensor strips on a second sheet until all the detected resistive sensor strips on a first sheet have been processed.

12. The apparatus of claim 7, wherein the processing system is further adapted to:
track the minimum and maximum first voltages, wherein the minimum voltage occurs at a first physical location of a first boundary of the second strip, and the maximum voltage occurs at a second physical location of a second boundary of the second strip, and
calculate the coordinates of the touch along the first strip by interpolating between the first and second physical locations or the first and second boundaries based on where the first voltage falls between the minimum and maximum voltages; and
track the minimum and maximum second voltages, wherein the minimum voltage occurs at a first physical location of a first boundary of the first strip, and the maximum voltage occurs at a second physical location of a second boundary of the first strip, and calculate the coordinates of the touch along the second strip by interpolating between the first and second physical locations of the first and second boundaries based on where the first voltage falls between the minimum and maximum voltages.

\* \* \* \* \*